United States Patent [19]
Ito et al.

[11] Patent Number: 5,157,921
[45] Date of Patent: Oct. 27, 1992

[54] METHOD FOR MEASURING CONVERSION EFFICIENCY OF CATALYST AND DETECTING DETERIORATION THEREOF WITH AIR/FUEL RATIO SENSORS

[75] Inventors: Yasuo Ito, Nagoya; Nobuhiro Hayakawa, Chita, both of Japan

[73] Assignee: NGK Spark Plug Co., Ltd., Aichi, Japan

[21] Appl. No.: 683,633

[22] Filed: Apr. 11, 1991

[30] Foreign Application Priority Data

Apr. 11, 1990 [JP] Japan .................................. 2-95693

[51] Int. Cl.$^5$ .............................................. F01N 3/20
[52] U.S. Cl. ...................................... 60/274; 60/276; 60/277; 73/118.1
[58] Field of Search .................... 60/274, 276, 277; 73/118.1

[56] References Cited

U.S. PATENT DOCUMENTS

| | | | |
|---|---|---|---|
| 3,969,932 | 7/1976 | Rieger | 60/277 |
| 4,622,809 | 11/1986 | Abthoff | 60/276 |
| 4,884,066 | 11/1989 | Miyata | 60/277 |
| 5,097,700 | 3/1992 | Nakane | 73/118.1 |

FOREIGN PATENT DOCUMENTS

| | | |
|---|---|---|
| 63-205441 | 8/1988 | Japan . |
| 63-231252 | 9/1988 | Japan . |
| 45913 | 2/1989 | Japan ................................ 60/276 |
| 2178857 | 2/1987 | United Kingdom ............... 60/276 |

Primary Examiner—Douglas Hart
Attorney, Agent, or Firm—Sughrue, Mion, Zinn, Macpeak & Seas

[57] ABSTRACT

The invention provides a method for accurately and precisely measuring a converted rate of a catalyst for HC/CO/NOx, NOx, and HC/CO and detecting deterioration using two air/fuel ratio sensors disposed on the upstream and downstream sides of the catalyst. The converted rate of the catalyst is determined based on a predetermined relationship between the mean converted rate and a reduction ratio of output amplitudes of the downstream sensor to the upstream sensor. The catalyst is determined to be deteriorating when the reduction ratio becomes less than a predetermined value.

17 Claims, 7 Drawing Sheets

METHOD FOR MEASURING CONVERSION EFFICIENCY OF CATALYST AND DETECTING DETERIORATION THEREOF WITH AIR/FUEL RATIO SENSORS

BACKGROUND OF THE INVENTION

The present invention relates to a method for measuring the conversion efficiency of a catalyst and detecting deterioration thereof with air/fuel ratio sensors. More particularly, the invention pertains to a method for measuring mean converted rates of hydrocarbons+carbon monoxide+nitrogen oxides (HC/CO/NOx), NOx, and HC/CO. The invention is also utilized for detecting deterioration of a catalyst so as to alert the operator to replace the catalyst in a timely manner.

A conventional method detects deterioration of a catalyst based on the difference between the maximum output voltages of two oxygen sensors disposed on the upstream and downstream sides of the catalyst (Japanese Published Unexamined Patent Application No. Sho-63-231252). An air/fuel ratio controller has also been disclosed, which adequately controls the air/fuel ratio with two/fuel ratio sensors even with a deteriorating catalyst (Japanese Published Unexamined Patent Application No. Sho-63-205441).

Figure 12:
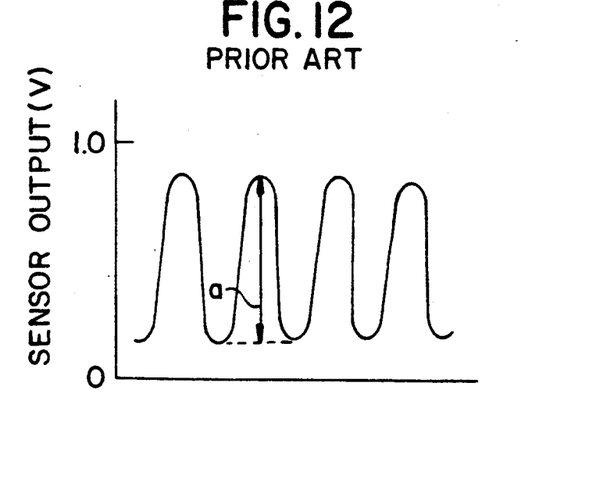
FIG. 12 is a graph showing a waveform of output from an oxygen sensor.
Figure 13:
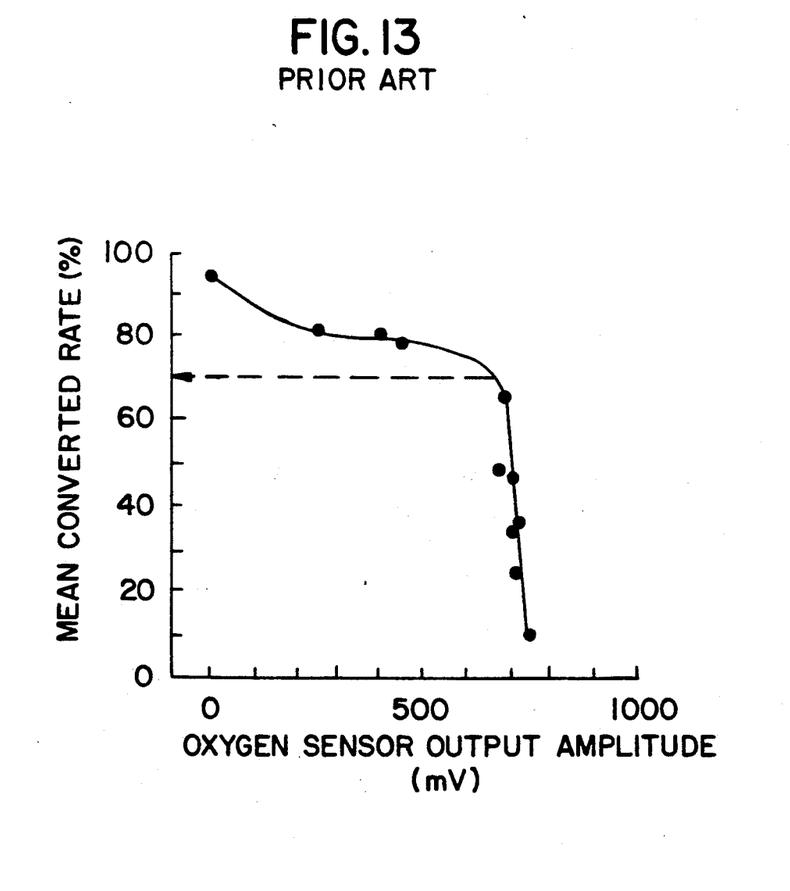
FIG. 13 is a graph showing a relationship between the output amplitude and the mean converted rate in the oxygen sensor of FIG. 2.

The output characteristic of an oxygen sensor changes abruptly around $\lambda = 1$. In other words, as shown in FIG. 12, the waveform of the output switches between a lean air/fuel ratio and a rich air/fuel ratio with a steep slope and does not show an intermediate or mean value. Accordingly, in the conventional method for detecting deterioration of a catalyst with two oxygen sensors, processing of comparison data between two waveforms is rather troublesome and complicated. Moreover, accurate and precise detection is difficult for a converted rate of lower than 70% as seen in FIG. 13.

Although analyzers are useful for directly determining the concentration of each component of exhaust gas, i.e., HC, CO, and NOx, (especially useful for the determination of NOx), they are composed of numerous devices, large-sized and expensive; in addition, the measurement process is quite complex.

SUMMARY OF THE INVENTION

One objective of the invention is thus to provide an improved method for accurately and precisely measuring the conversion efficiency of a catalyst and detecting deterioration thereof.

Another objective of the invention is to provide a method for accurately measuring a wide range of conversion efficiency rates, i.e., 0 to 100%, of a catalyst.

A further objective of the invention is to provide a method for readily and accurately measuring converted rates of NOx, HC/CO, and HC/CO/NOx in exhaust gas by detecting output amplitudes for a lean mixture, a rich mixture, or both, respectively.

The above and other related objectives are realized by a method for measuring the conversion efficiency of a catalyst, which includes the steps of:

(a) providing an upstream air/fuel ratio sensor on the upstream side of a catalyst for converting harmful and toxic components of exhaust gas and a downstream air/fuel ratio sensor on the downstream side of the catalyst;

(b) measuring a reduction ratio of an output amplitude of the downstream air/fuel ratio sensor to an output amplitude of the upstream air/fuel ratio sensor; and (c) determining a mean conversion efficiency of the catalyst for three toxic components of exhaust gas, i.e., hydrocarbons (HC), carbon monoxide (CO), and nitrogen oxides (NOx), based on a predetermined relationship between the reduction ratio and the mean converted rate of HC/CO/NOx.

Another feature of the invention is a method for measuring a conversion efficiency of a catalyst for nitrogen oxides or NOx, which includes the steps of:

(a) providing an upstream air/fuel ratio sensor on the upstream side of a catalyst for converting harmful and toxic components of exhaust gas and a downstream air/fuel ratio sensor on the downstream side of the catalyst;

(b) measuring a reduction ratio of an output amplitude for a lean mixture of the downstream air/fuel ratio sensor to an output amplitude for a lean mixture of the upstream air/fuel ratio sensor; and (c) determining a mean conversion efficiency of the catalyst for NOx based on a predetermined relationship between the reduction ratio and the mean converted rate of NOx.

A third feature of the invention is a method for measuring a conversion efficiency of a catalyst for hydrocarbons and carbon monoxide or HC/CO, which includes the steps of:

(a) providing an upstream air/fuel ratio sensor on the upstream side of a catalyst for converting harmful and toxic components of exhaust gas and a downstream air/fuel ratio sensor on the downstream side of the catalyst;

(b) measuring a reduction ratio of an output amplitude for a rich mixture of the downstream air/fuel ratio sensor to an output amplitude for a rich mixture of the upstream air/fuel ratio sensor; and (c) determining a mean conversion efficiency of the catalyst for HC/CO based on a predetermined relationship between the reduction ratio and the mean converted rate of HC/CO.

A fourth feature of the invention is a method for detecting deterioration of a catalyst, which includes the steps of:

(a) providing an upstream air/fuel ratio sensor on the upstream side of a catalyst for converting harmful and toxic components of exhaust gas and a downstream air/fuel ratio sensor on the downstream side of the catalyst; and (b) detecting deterioration of the catalyst when a reduction ratio of an output amplitude of the downstream air/fuel ratio sensor to an output amplitude of the upstream air/fuel ratio sensor becomes less than a predetermined value.

Figure 2:
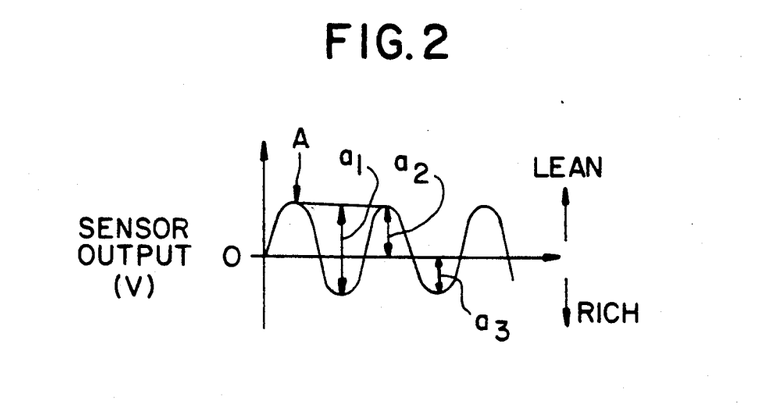
FIG. 2 is a graph showing a waveform of output from the upstream air/fuel ratio sensor of FIG. 1.
Figure 3:
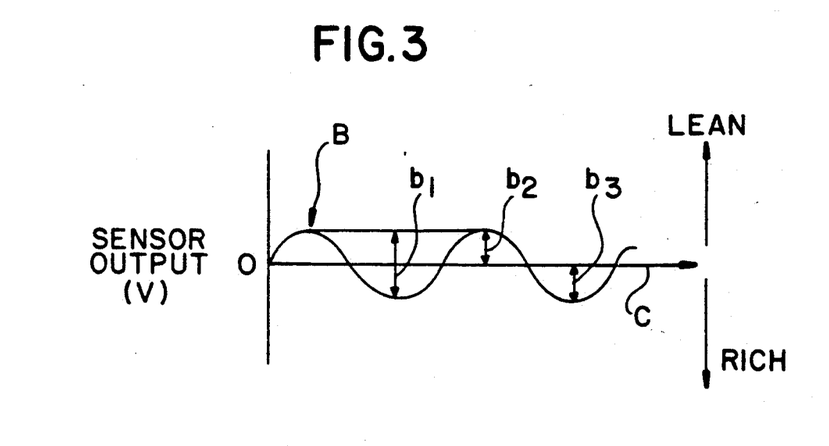
FIG. 3 is showing a waveform of output from the downstream air/fuel ratio sensor of FIG. 1.
Figure 11:
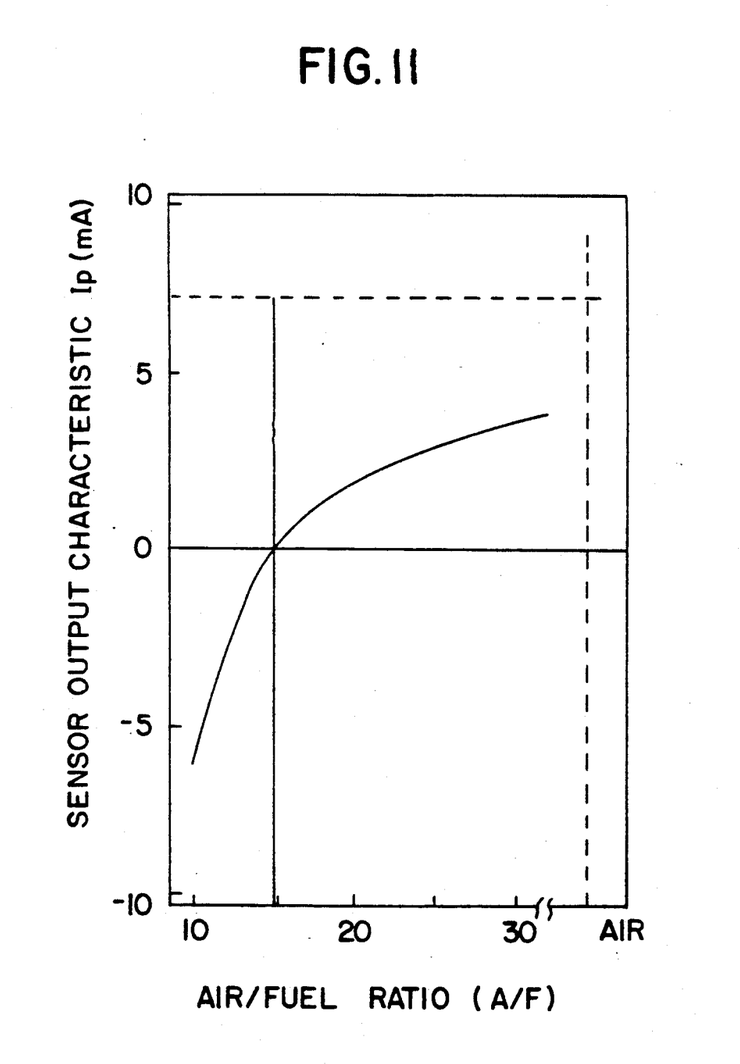
FIG. 11 is a graph showing a relationship between the air/fuel ratio and the output characteristics in the air/fuel ratio sensor of FIG. 10.

Air/fuel ratio sensors are disposed on the upstream and downstream sides of a catalyst as described above. The output of the air/fuel ratio sensor of the invention gives a curve with a gentle slope showing a relationship between the air/fuel ratio and the output characteristic of the sensor as shown in FIG. 11. The output waveform of the air/fuel ratio sensor does not change abruptly around the air/fuel ratio of 14.6 like conventional oxygen sensors. As seen in FIGS. 2 and 3, an output amplitude b1 in a waveform B of the downstream sensor decreases to various values less than an output amplitude as in a waveform A of the upstream sensor corresponding to the degree of deterioration of the catalyst. When a conversion efficiency of the catalyst is 100%, the output amplitude in the waveform B of the downstream sensor is equal to zero in an approximately linear waveform C as shown in FIG. 3.

Figure 7:
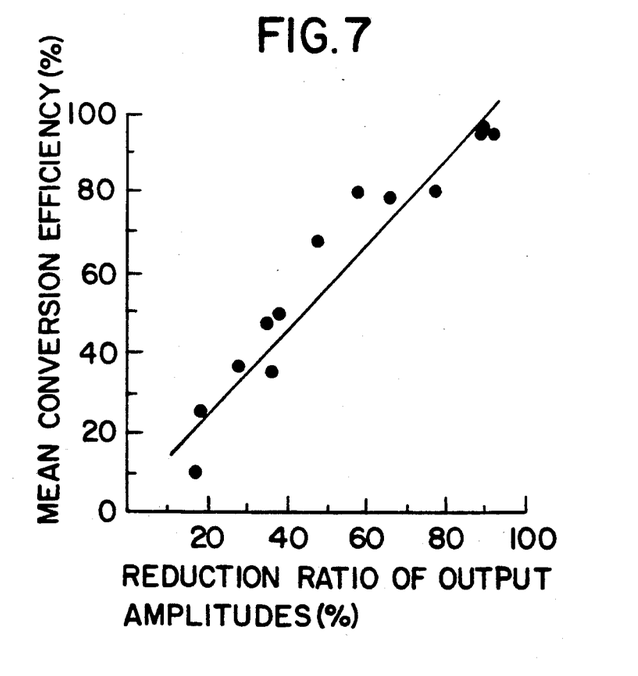
FIG. 7 is a graph showing a relationship between the reduction ratio of output amplitudes and the mean converted rate of HC/CO/NOx in the embodiment.

An approximately linear relationship exists between the reduction ratio of the output amplitudes b1 to a1 and the mean converted rate of HC/CO/NOx in exhaust gas as shown in FIG. 7. The conversion efficiency of the catalyst for HC/CO/NOx is then determined based on the relationship above. Accordingly, the method of the invention accurately and precisely detects the conversion efficiency of the catalyst. The reduction ratio is calculated from the following equation.

$$\text{Reduction ratio} = (a-b)/a \times 100$$

where a denotes an output amplitude of the upstream sensor; and b denotes an output amplitude of the downstream sensor.

Figure 8:
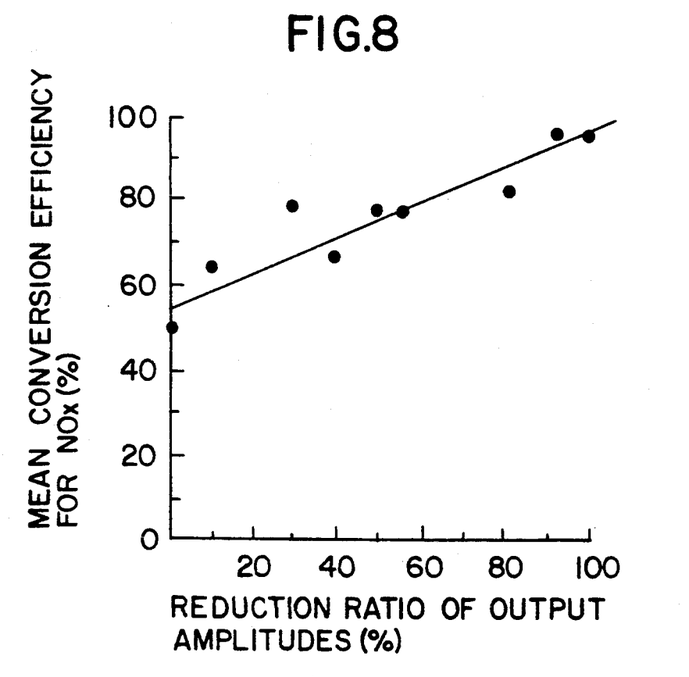
FIG. 8 is a graph showing a relationship between the reduction ratio of output amplitudes and the mean converted rate of NOx in the embodiment.

NOx is dominant in exhaust gas at lean air/fuel ratios. An approximately linear relationship also exists between the converted rate of NOx and the reduction ratio of an output amplitude b2 for a lean mixture of the downstream sensor to an output amplitude a2 for a lean mixture of the upstream sensor as shown in FIG. 8. Accordingly, the conversion efficiency of the catalyst for NOx is determined from the relationship above.

Figure 9:
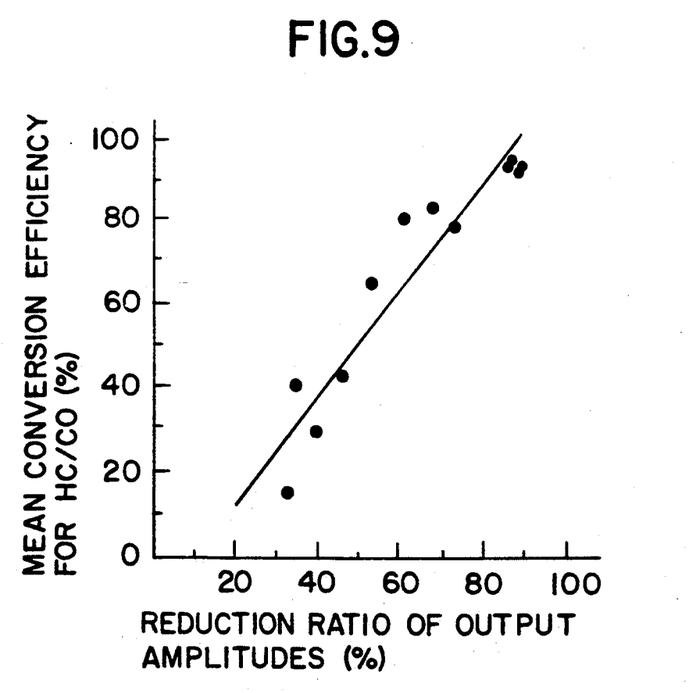
FIG. 9 is a graph showing a relationship between the reduction ratio of output amplitudes and the mean converted rate of HC/CO in the embodiment.

HC/CO is dominant in exhaust gas at rich air/fuel ratios. An approximately linear relationship also exists between the converted rate of HC/CO and the reduction ratio of an output amplitude b3 for a rich mixture of the downstream sensor to an output amplitude a3 for a rich mixture of the upstream sensor as shown in FIG. 9. Accordingly, the conversion efficiency of the catalyst for HC/CO is determined from the relationship above.

BRIEF DESCRIPTION OF THE DRAWINGS

The invention may be best understood by referring to the following detailed description of the preferred embodiment and the accompanying drawings, wherein like numerals denote like elements and in which.

DETAILED DESCRIPTION OF THE PREFERRED EMBODIMENT

A preferred embodiment of the invention is now explained in detail referring to the drawings.

(1) Structure of Apparatus

Figure 1:
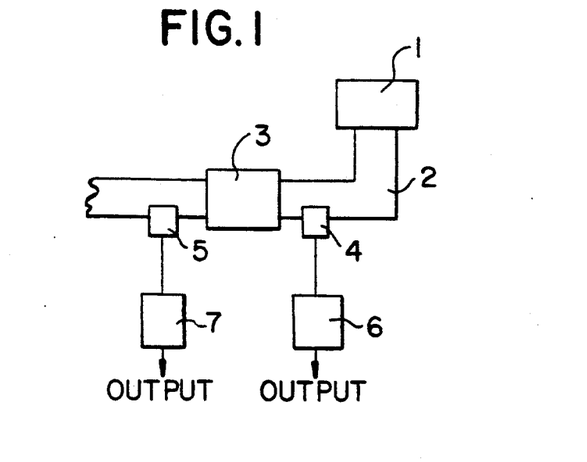
FIG. 1 is a block diagram illustrating the main concept of the invention.
Figure 4:
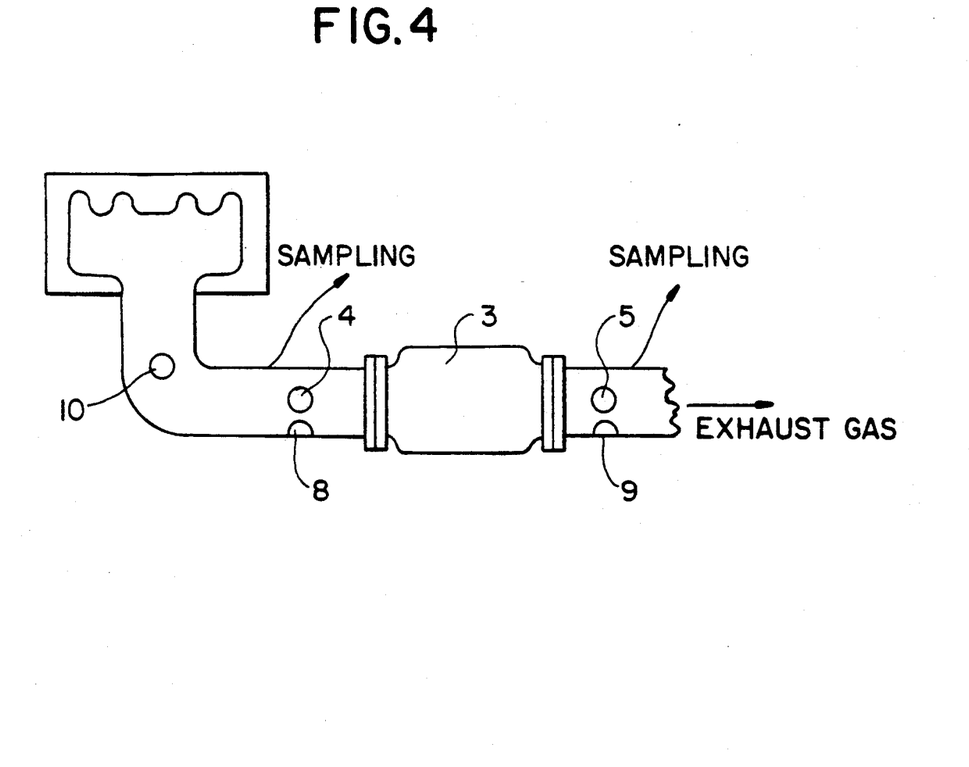
FIG. 4 is a schematic view illustrating apparatus for measuring a conversion efficiency of a catalyst and detecting deterioration thereof embodying the invention.

FIG. 1 is a block diagram illustrating an air/fuel ratio measuring apparatus for an internal combustion engine, which is used for measuring a conversion efficiency of a catalyst and detecting deterioration thereof. FIG. 4 is a schematic view illustrating the locations of air/fuel ratio sensors in the apparatus.

As shown in FIGS. 1 and 4, a three-way catalyst 3 is provided in an exhaust manifold 2 of an internal combustion engine 1. Air/fuel ratio sensors 4 and 5 are respectively disposed on the upstream and downstream sides of the three-way catalyst 3 in the exhaust manifold 2. The air/fuel ratio sensors 4 and 5 are selectively connected to sensor control units 6 and 7 for detecting sensor output, respectively. A control λ sensor 10 is also provided in the exhaust manifold 2. Oxygen sensors 8 and 9 are disposed at substantially the same locations as the air/fuel ratio sensors 4 and 5 in the exhaust manifold 2 for reference.

Figure 10:
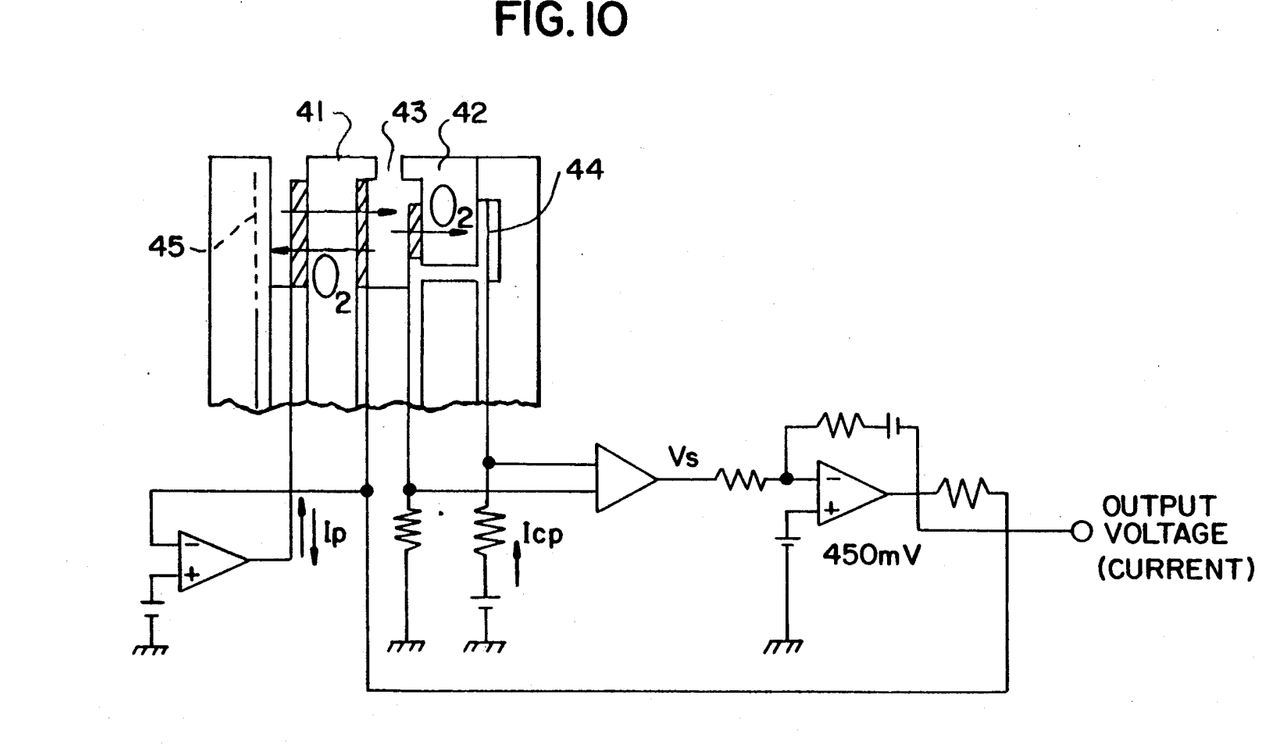
FIG. 10 is an explanatory view illustrating the principle of the air/fuel ratio sensor used in the embodiment.

The air/fuel ratio sensors 4 and 5 may be any conventional type. The principle of the air/fuel ratio sensors 4 and 5 is explained according to FIG. 10. An oxygen partial pressure of exhaust gas flowing into a diffusion chamber 43 formed between an Ip cell 41 and a Vs/Icp cell 42 is held constant with a pump. An output current or output voltage is read, which is required for maintaining a constant voltage (for example, 450 mV in FIG. 10). The voltage is attributable to the difference between oxygen partial pressures in the diffusion chamber 43 and in an oxygen reference room 44. The numeral 45 in FIG. 10 denotes a heater.

(2) Measure of a Mean Conversion Efficiency of a Catalyst for HC/CO/NOx and Detection of Deterioration of the Catalyst A reduction ratio of an output amplitude b1 of the downstream sensor 5 to an output amplitude a1 of the upstream sensor 4 is measured against various converted rates of HC/CO/NOx. The relationship obtained makes a calibration curve.

Figure 5:
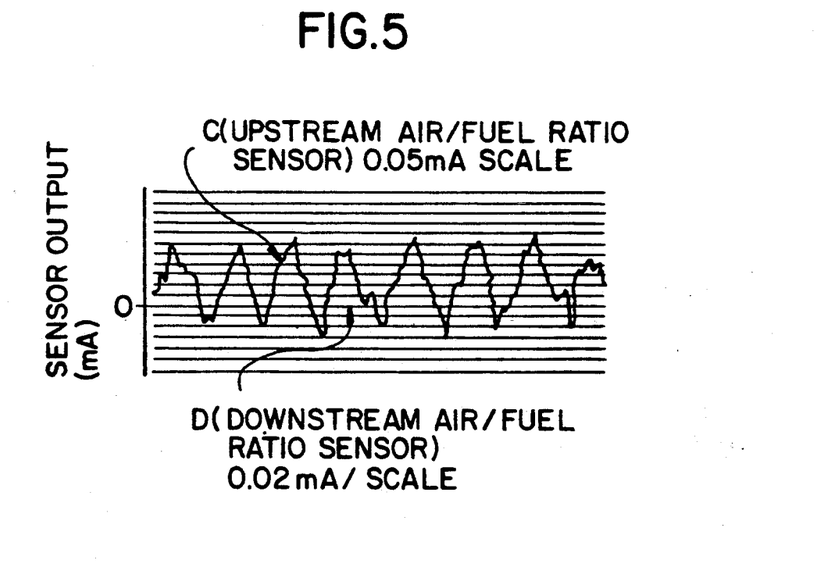
FIG. 5 is a graph showing waveforms of output from the upstream and downstream air/fuel ratio sensors when a new catalyst is used in the embodiment.
Figure 6:
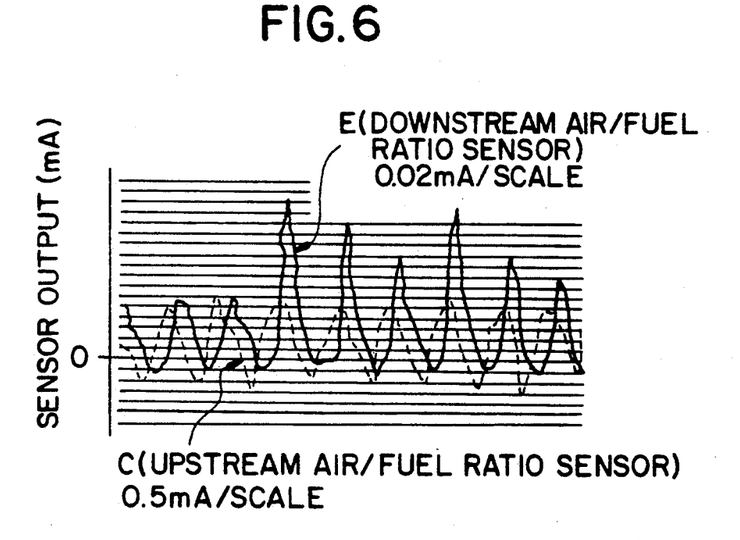
FIG. 6 is a graph showing waveforms of output from the upstream and downstream air/fuel ratio sensors when a deteriorating catalyst is used in the embodiment.

When a new catalyst is used under certain engine operating conditions (2.0L×4 cylinders; engine speed; 2,400 rpm; booster pressure: −200 mmHG), as shown in FIG. 5, the upstream sensor 4 gives a waveform C and the downstream sensor 5 gives an approximately linear waveform D indicating almost 100% purification efficiency. On the other hand, when a deteriorating catalyst is used under the same conditions, as shown in FIG. 6, the downstream sensor 5 gives a waveform E which is similar to the waveform C of the upstream sensor 4 but has a smaller amplitude. In both FIGS. 5 and 6, output of the downstream sensor 5, i.e., the waveforms D and E, is amplified 2.5 times as large as output of the upstream sensor 4, i.e., the waveform C.

Each component of exhaust gas, i.e., hydrocarbons (HC), carbon monoxide (CO), or nitrogen oxides (NOx), sampled at the two locations shown in FIG. 4 is determined with an analyzer. The converted rate of HC/CO/NOx is calculated based on the determination of each component.

An approximately linear relationship exists between the reduction ratio of output amplitudes and the mean converted rate of HC/CO/NOx as shown in FIG. 7. Accordingly, the conversion efficiency of the catalyst is calculated from the reduction rate. The method is applicable to virtually any conversion efficiency, i.e., 0 to 100%, of the catalyst.

Furthermore, deterioration of the catalyst is readily and accurately determined based on the above linear relationship. Namely, when the reduction ratio of output amplitudes becomes less than a predetermined value, the catalyst is determined to be deteriorating. The predetermined value can be set according to any desired objectives and/or regulations related to the efficiency of the catalytic converter. For example, the United States is presently considering an exhaust gas control bill referred to as the Onboard Diagnostic System II bill. Under the term of the bill, if passed, efficiency of the HC removal would have to be 40–50 percent or higher. Thus, the predetermined value described above could be set to that level to assure compliance with the regulation.

A relationship between the output amplitude of the downstream oxygen sensor 9 and the mean converted rate may also be obtained. In the conventional method using oxygen sensors 8 and 9, the conversion efficiency of less than 70% is not accurately detectable as seen in FIG. 13.

(3) Measure of a Mean Conversion Efficiency of a Catalyst for NOx and Detection of Deterioration of the Catalyst NOx is dominant in exhaust gas at lean air/fuel ratios. An approximately linear relationship also exists between the converted rate of NOx of higher than 55% and the reduction ratio of an output amplitude b2 for a lean mixture of the downstream sensor 5 to an output amplitude a2 for a lean mixture of the upstream sensor 4 as shown in FIG. 8.

Accordingly, the conversion efficiency of the catalyst for NOx of higher than 55% is readily and accurately determined from the linear relationship above. Deterioration of the catalyst for NOx is also determined based on this relationship. Namely, when the reduction ratio of output amplitudes becomes less than a predetermined value, the catalyst is determined to be deteriorating.

(4) Measure of a Mean Conversion Efficiency of a Catalyst for HC/CO and Detection of Deterioration of the Catalyst HC/CO is dominant in exhaust gas at rich air/fuel ratios. An approximately linear relationship also exists between the converted rate of HC/CO and the reduction ratio of an output amplitude b3 for a rich mixture of the downstream sensor 5 to an output amplitude a5 for a rich mixture of the upstream sensor 4 as shown in FIG. 9.

Accordingly, the conversion efficiency of the catalyst for HC/CO is readily and accurately determined from the linear relationship above. Deterioration of the catalyst for HC/CO is determined in the same manner as above.

As described above, the method of the present invention readily, accurately and inexpensively determines the conversion efficiency of a catalyst without any bulky and complicated apparatus. Especially, the method is applicable to virtually any conversion efficiency, i.e., 0 to 100%, while the conventional method with two oxygen sensors can only detect the conversion efficiency of 70% or above with sufficient accuracy.

The method of the present invention simultaneously detects the mean converted rates of HC/CO/NOx, NOx, and HC/CO, thus saving labor and cost.

The method is also useful for detecting deterioration of a catalyst for HC/CO/NOx, NOx, and HC/CO readily and accurately.

Since there may be various modifications and changes without departing from the scope of the invention, the embodiment above is not intended to limit the invention to the embodiment but is intended to illustrate in the invention more clearly.

What is claimed is:

1. A method for measuring the conversion rate of a catalyst which converts harmful and toxic components of exhaust gas of an internal combustion engine, comprising the steps of:
   (a) providing an upstream air/fuel ratio sensor and a downstream air/fuel ratio sensor in an exhaust manifold of said engine, said upstream sensor being positioned on the upstream side of the catalyst and said downstream sensor being positioned on the downstream side of the catalyst;
   (b) measuring the reduction ratio of an output amplitude of the downstream air/fuel ratio sensor to an output of the upstream air/fuel ratio sensor; and
   (c) comparing the reduction ratio with a predetermined mean converted rate of HC, CO and $NO_x$ to determine a mean converted rate of the catalyst for HC, CO, and $NO_x$ in said exhaust gas.

2. A method as claimed in claim 1, in which the reduction ratio is calculated by an equation;

$$\text{Reduction ratio} = (a1 - b1)/a1 \times 100$$

where a1 denotes an output amplitude of the upstream sensor; and b1 denotes an output amplitude of the downstream sensor.

3. A method as claimed in claim 1, in which the catalyst is a three-way catalyst.

4. A method for measuring the conversion rate of a catalyst which converts harmful and toxic components of exhaust gas of an internal combustion engine, comprising the steps of:
   (a) providing an upstream air/fuel ratio sensor and a downstream air/fuel ratio sensor in an exhaust manifold of said engine, said upstream sensor being positioned on the upstream side of the catalyst and said downstream sensor being positioned on the downstream side of the catalyst;
   (b) measuring the reduction ratio of an output amplitude of the downstream air/fuel ratio sensor to an output of the upstream air/fuel ratio sensor;
   (c) determining a mean converted rate of the catalyst for HC, CO, and $NO_x$ in said exhaust gas; and
   (d) comparing the reduction ratio with the predetermined mean converted rate of HC, CO and $NO_x$ using a diagram containing a predetermined linear relationship between the reduction ratio and the mean converted rate of HC, CO, and $NO_x$.

5. A method for measuring a converted rate of a catalyst, according to claim 4, wherein the diagram of the predetermined linear relationship is prepared according to the steps of:

(a) sampling the specimen gas from an exhaust manifold of an internal combustion engine;
(b) measuring the reduction ratio and the mean converted rate of HC, CO, and NOx of the specimen gas;
(c) plotting points from the measured reduction ratio and the measured mean converted rate of HC, CO, and NOx;
(d) determining the predetermined linear relationship from the plotted points.

6. A method for measuring the conversion rate of a catalyst which converts harmful and toxic components of exhaust gas of an internal combustion engine for $NO_x$, comprising the steps of:
(a) providing an upstream air/fuel ratio sensor and a downstream air/fuel ratio sensor in an exhaust manifold of said engine, said upstream sensor being positioned on the upstream side of the catalyst and said downstream sensor being positioned on the downstream side of the catalyst;
(b) measuring the reduction ratio of an output amplitude of the downstream air/fuel ratio sensor for a lean air/fuel mixture to an output of the upstream air/fuel ratio sensor for a lean air/fuel mixture; and
(c) comparing the reduction ratio with a predetermined mean converted rate of $NO_x$ to determine a mean converted rate of the catalyst for $NO_x$ in said exhaust gas.

7. A method as claimed in claim 6, in which the reduction ratio is calculated by an equation;

$$\text{Reduction ratio} = (a2 - b2)/a2 \times 100$$

where a2 denotes an output amplitude for a lean mixture of the upstream sensor; and b2 denotes an output amplitude for a lean mixture of the downstream sensor.

8. A method as claimed in claim 6, in which the catalyst is a three-way catalyst.

9. A method for measuring the conversion rate of a catalyst which converts harmful and toxic components of exhaust gas of an internal combustion engine for $NO_x$, comprising the steps of:
(a) providing an upstream air/fuel ratio sensor and a downstream air/fuel ratio sensor in an exhaust manifold of said engine, said upstream sensor being positioned on the upstream side of the catalyst and said downstream sensor being positioned on the downstream side of the catalyst;
(b) measuring the reduction ratio of an output amplitude of the downstream air/fuel ratio sensor for a lean air/fuel mixture to an output of the upstream air/fuel ratio sensor for a lean air/fuel mixtures;
(c) determining a mean converted rate of the catalyst for $NO_x$ in said exhaust gas; and
(d) comparing the reduction ratio with the predetermined mean converted rate of $NO_x$ using a diagram containing a predetermined linear relationship between the reduction ratio and the mean converted rate of $NO_x$.

10. A method for measuring a converted rate of a catalyst according to claim 9, wherein the diagram of the predetermined linear relationship is prepared according to the steps of:
(a) sampling the specimen gas from an exhaust manifold of an internal combustion engine;
(b) measuring the reduction ration and the mean converted rate of NOx of the specimen gas;
(c) plotting points from the measured reduction ratio and the measured mean rate of NOx; and
(d) determining the predetermined linear relationship from the plotted points.

11. A method for measuring the conversion rate of a catalyst which converts harmful and toxic components of exhaust gas of an internal combustion engine for HC and CO, comprising the steps of:
(a) providing an upstream air/fuel ratio sensor and a downstream air/fuel ratio sensor in an exhaust manifold of said engine, said upstream sensor being positioned on the upstream side of the catalyst and said downstream sensor being positioned on the downstream side of the catalyst;
(b) measuring the reduction ratio of an output amplitude of the downstream air/fuel ratio sensor for a rich air/fuel mixture to an output of the upstream air/fuel ratio sensor for a rich air/fuel mixture; and
(c) comparing the reduction ratio with a predetermined mean converted rate of HC and CO to determine a mean converted rate of the catalyst for HC and CO in said exhaust gas.

12. A method as claimed in claim 11, in which the reduction ratio is calculated by an equation;

$$\text{Reduction ratio} = (a3 - b3)/a3 \times 100$$

where a3 denotes an output amplitude for a rich mixture of the upstream sensor; and b3 denotes an output amplitude for a rich mixture of the downstream sensor.

13. A method as claimed in claim 11, in which the catalyst is a three-way catalyst.

14. A method for measuring the conversion rate of a catalyst which converts harmful and toxic components of exhaust gas of an internal combustion engine for HC and CO, comprising the steps of:
(a) providing an upstream air/fuel ratio sensor and a downstream air/fuel ratio sensor in an exhaust manifold of said engine, said upstream sensor being positioned on the upstream side of the catalyst and said downstream sensor being positioned on the downstream side of the catalyst;
(b) measuring the reduction ratio of an output amplitude of the downstream air/fuel ratio sensor for a rich air/fuel mixture to an output of the upstream air/fuel ratio sensor for a rich air/fuel mixture;
(c) determining a mean converted rate of the catalyst for HC and CO in said exhaust gas; and
(d) comparing the reduction ratio with the predetermined mean converted rate of HC and CO using a diagram containing a predetermined linear relationship between the reduction ratio and the mean converted rate of HC and CO.

15. A method for measuring a converted rate of a catalyst, according to claim 14, wherein the diagram of the predetermined linear relationship is prepared according to the steps of:
(a) sampling the specimen gas from an exhaust manifold of an internal combustion engine;
(b) measuring the reduction ratio and the mean converted rate of HC and CO of the specimen gas;
(c) plotting points from the measured reduction ratio and the measured mean rate of HC and CO; and
(d) determining the predetermined linear relationship from the plotted points.

16. A method for measuring the conversion rate of a catalyst which converts harmful and toxic components of exhaust gas of an internal combustion engine, comprising the steps of:
(a) providing an upstream air/fuel ratio sensor and a downstream air/fuel ratio sensor in an exhaust manifold of said engine, said upstream sensor being positioned on the upstream side of the catalyst and said downstream sensor being positioned on the downstream side of the catalyst; and
(b) detecting deterioration of the catalyst when a reduction ratio of an output amplitude of the downstream air/fuel ratio sensor to an output amplitude of the upstream air/fuel ratio sensor becomes less than a predetermined value.

17. A method as claimed in claim 16, in which the catalyst is a three-way catalyst.

* * * * *